US011724740B2

(12) United States Patent
Cautillo et al.

(10) Patent No.: US 11,724,740 B2
(45) Date of Patent: Aug. 15, 2023

(54) METHOD FOR OPERATING AN ULTRASONIC SENSOR DEVICE FOR A MOTOR VEHICLE TO MONITOR A GROUND AREA BELOW THE MOTOR VEHICLE, ULTRASONIC SENSOR DEVICE, DRIVER ASSISTANCE SYSTEM AND MOTOR VEHICLE

(71) Applicant: Valeo Schalter und Sensoren GmbH, Bietigheim-Bissingen (DE)

(72) Inventors: Luca Cautillo, Bietigheim-Bissingen (DE); Joerg Schrepfer, Bietigheim-Bissingen (DE); Marvin Simchen, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 469 days.

(21) Appl. No.: 16/613,563

(22) PCT Filed: May 28, 2018

(86) PCT No.: PCT/EP2018/063892
§ 371 (c)(1),
(2) Date: Nov. 14, 2019

(87) PCT Pub. No.: WO2018/219849
PCT Pub. Date: Dec. 6, 2018

(65) Prior Publication Data
US 2020/0140012 A1 May 7, 2020

(30) Foreign Application Priority Data
May 31, 2017 (DE) .......................... 102017111932.9

(51) Int. Cl.
*B62D 15/02* (2006.01)
*G01S 15/931* (2020.01)
*B60W 30/06* (2006.01)

(52) U.S. Cl.
CPC .......... *B62D 15/027* (2013.01); *B60W 30/06* (2013.01); *G01S 15/931* (2013.01); *B60W 2420/54* (2013.01); *G01S 2015/932* (2013.01)

(58) Field of Classification Search
CPC . B62D 15/027; B60W 2420/54; B60W 30/06; G01S 2015/932; G01S 15/931
See application file for complete search history.

(56) References Cited

U.S. PATENT DOCUMENTS 5,521,594 A 5/1996 Fukushima
9,227,479 B2 * 1/2016 Clarke ............ B60W 30/18009
(Continued)

FOREIGN PATENT DOCUMENTS

CN 102929452 A 2/2013
CN 103625363 A 3/2014
(Continued)

OTHER PUBLICATIONS

First Office Action in corresponding Chinese Application No. 201880036622.6, dated Jul. 14, 2021 (23 pages).
(Continued)

*Primary Examiner* — Peter D Nolan
*Assistant Examiner* — Demetra R Smith-Stewart
(74) *Attorney, Agent, or Firm* — Osha Bergman Watanabe & Burton LLP

(57) ABSTRACT

The invention relates to a method for operating an ultrasonic sensor device (3) for a motor vehicle (1), with which an ultrasonic signal is emitted into a ground area (5) below the motor vehicle (1) and an ultrasonic signal from the ground area (5) is received and an object (6) in the ground area (5)
(Continued)

is detected by means of a control unit (10) on the basis of the emitted and/or the received ultrasonic signals, wherein the ultrasonic signal is emitted by a first ultrasonic sensor (4*a*) of the ultrasonic sensor device (3) and the ultrasonic signal emitted by the first ultrasonic sensor (4*a*) and reflected at a road surface (9) in the ground area (5) is received by a second ultrasonic sensor (4*b*) of the ultrasonic sensor device (3) and the object (6) is detected by the control unit (10) on the basis of a proportion of the ultrasonic signal that is received by the second ultrasonic sensor (4*b*).

14 Claims, 3 Drawing Sheets

(56) References Cited

U.S. PATENT DOCUMENTS

| | | | | |
|---|---|---|---|---|
| 10,007,262 | B1* | 6/2018 | Schwindt | G07C 5/008 |
| 10,160,454 | B2* | 12/2018 | Barthel | B60W 50/14 |
| 2004/0201462 | A1* | 10/2004 | Hartlieb | G01S 13/931 |
| | | | | 340/435 |
| 2009/0251990 | A1* | 10/2009 | Preissler | G01S 7/52004 |
| | | | | 367/13 |
| 2012/0176864 | A1* | 7/2012 | Karl | G01S 7/539 |
| | | | | 367/89 |
| 2015/0046032 | A1* | 2/2015 | Clarke | G01F 23/2965 |
| | | | | 701/37 |
| 2015/0046071 | A1* | 2/2015 | Clarke | G01F 23/2965 |
| | | | | 701/112 |
| 2017/0108586 | A1* | 4/2017 | Ueda | G01S 13/48 |
| 2017/0176592 | A1* | 6/2017 | Hoare | B60W 30/18009 |
| 2017/0308099 | A1* | 10/2017 | Kim | B64C 17/06 |
| 2018/0239017 | A1* | 8/2018 | Milschewski | G01S 15/10 |
| 2019/0004172 | A1* | 1/2019 | Moskovchenko | G01S 7/529 |

FOREIGN PATENT DOCUMENTS

| | | | |
|---|---|---|---|
| CN | 104608689 A | 5/2015 | |
| DE | 103 22 617 A1 | 12/2004 | |
| DE | 10 2009 033236 A1 | 1/2011 | |
| DE | 102011108218 A1 * | 3/2012 | ............. B60G 17/08 |
| DE | 10 2013 001119 A1 | 7/2014 | |
| DE | 10 2013 207823 A1 | 10/2014 | |
| DE | 10 2014 202497 A1 | 8/2015 | |
| DE | 10 2014 222486 A1 | 5/2016 | |
| DE | 10 2015 106403 A1 | 10/2016 | |
| JP | 2007-230319 A | 9/2007 | |

OTHER PUBLICATIONS

International Search Report and Written Opinion in corresponding International Application No. PCT/EP2018/063892, dated Aug. 28, 2018 (12 pages).

German Search Report in corresponding German Application No. 102017111932 9, dated Dec. 12, 2017 (6 pages).

* cited by examiner

METHOD FOR OPERATING AN ULTRASONIC SENSOR DEVICE FOR A MOTOR VEHICLE TO MONITOR A GROUND AREA BELOW THE MOTOR VEHICLE, ULTRASONIC SENSOR DEVICE, DRIVER ASSISTANCE SYSTEM AND MOTOR VEHICLE

The present invention relates to a method for operating an ultrasonic sensor device for a motor vehicle in which an ultrasonic signal is emitted into a ground area below the motor vehicle and an ultrasonic signal from the ground area is received and an object in the ground area is detected by a control unit on the basis of the emitted and/or the received ultrasonic signals. In addition, the present invention relates to an ultrasonic sensor device for a motor vehicle. Further, the present invention relates to a driver assistance system with such an ultrasonic sensor device. Finally, the present invention relates to a motor vehicle.

The interest in the present case is directed at ultrasonic sensor devices for motor vehicles. Ultrasonic sensor devices that comprise a plurality of ultrasonic sensors are known from the prior art. Such ultrasonic sensors can be used to monitor a surrounding area of the motor vehicle. In particular, a respective distance between the motor vehicle and the objects in the surrounding area can be determined by means of the ultrasonic sensors. Such an ultrasonic sensor device can be, for example, part of a driver assistance system, which assists the driver when parking in a parking space and/or when unparking out of a parking space.

In addition, ultrasonic sensor devices with which a ground area below the motor vehicle can be monitored are known from the prior art. In this regard, DE 10 2013 001 119 A1 describes a driver assistance system for assisting a driver in the parking and/or unparking of a vehicle, wherein the driver assistance system comprises at least one sensor device for detecting a surrounding area of the motor vehicle and a control unit for evaluating the signals of the sensor device.

For example, a distance between the ground and the bottom of the vehicle can be determined using the signals. The sensor device and the control unit are set up in such a way that the detection area of the sensor device contains at least one pre-settable ground area below the motor vehicle. The sensor device can include at least one ultrasonic sensor.

It is the object of the present invention to reveal a solution as to how a ground area below the motor vehicle can be more reliably monitored with an ultrasonic sensor device of the type mentioned above.

This object is achieved according to the invention by a method, by an ultrasonic sensor device, by a driver assistance system as well as by a motor vehicle with the features according to the respective independent claims. Advantageous further developments of the present invention are the subject of the dependent claims.

In an embodiment of a method for operating an ultrasonic sensor device for a motor vehicle, an ultrasonic signal is preferably emitted into a ground area below the motor vehicle and an ultrasonic signal is received from the ground area. In addition, an object in the ground area is preferably detected by means of a control unit on the basis of the emitted and/or the received ultrasonic signals. In addition, it is preferably provided that the ultrasonic signal is emitted by a first ultrasonic sensor of the ultrasonic sensor device and the ultrasonic signal emitted by the first ultrasonic sensor and reflected at a road surface in the ground area is received in particular with a second ultrasonic sensor of the ultrasonic sensor device. In addition, the object is preferably detected by the control unit on the basis of a proportion of the ultrasonic signal that is received by the second ultrasonic sensor.

A method according to the invention is used to operate an ultrasonic sensor device for a motor vehicle. Here, an ultrasonic signal is sent into a ground area below the motor vehicle and an ultrasonic signal is received from the ground area. In addition, an object in the ground area is detected by a control unit on the basis of the emitted and/or the received ultrasonic signals. The ultrasonic signal is emitted by a first ultrasonic sensor of the ultrasonic sensor device and the ultrasonic signal emitted by the first ultrasonic sensor and reflected at a road surface in the ground area is received by a second ultrasonic sensor of the ultrasonic sensor device. By means of the control unit, the object is detected on the basis of the proportion of the ultrasonic signal received by the second ultrasonic sensor.

The method is used to monitor the ground area below the motor vehicle. This ground area can preferably extend from the road surface on which the motor vehicle is currently located to an underbody of the motor vehicle. Thus, for example, before driving the motor vehicle it can be checked whether there is an object in the ground area. The method can be performed with an ultrasonic sensor device. This ultrasonic sensor device includes at least two ultrasonic sensors. The ultrasonic sensor device comprises at least one first ultrasonic sensor for sending the ultrasonic signal and at least one second ultrasonic sensor for receiving the ultrasonic signal. Preferably, it is provided that the ultrasonic sensor device comprises a plurality of ultrasonic sensors. The ultrasonic sensors can be designed to emit an ultrasonic signal. Furthermore, the ultrasonic sensors can be designed in such a way that they can receive an ultrasonic signal. Preferably, however, it is provided that both an ultrasonic signal can be emitted and an ultrasonic signal can be received with the respective ultrasonic sensors. The ultrasonic sensors may comprise a membrane that can be excited to mechanical vibrations with a converter element, in particular a piezoelectric element. This allows the ultrasonic signal to be emitted. To receive the ultrasonic signal, the vibration of the membrane that is caused by the received ultrasonic signal can be detected with the converter element and output in the form of a sensor signal. This sensor signal can then be evaluated by a control unit of the ultrasonic sensor device to detect the object.

According to an essential aspect of the present invention, it is now provided that the ultrasonic signal is emitted by the first ultrasonic sensor. This first ultrasonic sensor is operated as a transmitter and emits the ultrasonic signal. The ultrasonic signal is sent towards the road surface into the ground area by the first of the ultrasonic sensors. This ultrasonic signal is then reflected at the road surface and/or at the underbody of the motor vehicle and can be received by another or the second ultrasonic sensor. This means that the second ultrasonic sensor is operated as a receiver for receiving the ultrasonic signal. However, a plurality of first ultrasonic sensors for the respective transmission of the ultrasonic signal and/or a plurality of second ultrasonic sensors for the respective reception of the ultrasonic signal may also be provided. According to the present invention, it is not provided that a distance between the ultrasonic sensor and the road surface is determined. The ultrasonic signal is emitted by the first ultrasonic sensor and is received by the second ultrasonic sensor, wherein the second ultrasonic sensor is in a different position than the first ultrasonic sensor. The proportion of the emitted ultrasonic signal that can be received by the second ultrasonic sensor is now checked. Thus, whether and how much of the ultrasonic signal emitted by the first ultrasonic sensor is received by the second ultrasonic sensor is measured. If the object is located in the ground area between the first ultrasonic sensor and the second ultrasonic sensor, the emitted ultrasonic signal is at least partially reflected by this object. As a result, only a small proportion or no part of the emitted ultrasonic signal is received by the second ultrasonic sensor. This makes it easy and reliable to check whether there is an object in the ground area.

Preferably, the method can be carried out with a plurality of ultrasonic sensors. Since the ultrasonic sensors can preferably both emit and receive the ultrasonic signal, the ultrasonic sensors can be operated either as a first ultrasonic sensor or as a second ultrasonic sensor. The first ultrasonic sensors for sending the respective ultrasonic signal can be controlled simultaneously or successively in time.

The object is preferably detected based on the proportion of the ultrasonic signal received by the second ultrasonic sensor while the motor vehicle is at a standstill. Once the vehicle has been stopped or parked, the first ultrasonic sensor can be used to emit the ultrasonic signal and the ultrasonic signal reflected at the road surface can be received by the second ultrasonic sensor. In particular, it is possible to check whether there is an object in the ground area before starting a journey with the motor vehicle. Thus, for example, damage to the motor vehicle can be prevented. If the object is a living being, for example an animal, injury to the living being can be prevented.

Furthermore, it is advantageous if the proportion of the ultrasonic signal received by the second ultrasonic sensor is stored after stopping the motor vehicle and the proportion of the ultrasonic signal received by the second ultrasonic sensor is again determined at a later time and is compared with the stored proportion. If the motor vehicle is manoeuvred in the direction of a parking space on which it is to be parked, it can be assumed that there are no objects on the parking space, otherwise these would have been detected by the driver and/or the environment sensors. If the proportion of the ultrasonic signal received by the second ultrasonic sensor is determined immediately after the motor vehicle has been stopped, this proportion can be used as a reference for the condition that there is no object in the ground area. At a later time, the proportion of the ultrasonic signal that is received by the second ultrasonic sensor can be determined again. This can then be compared with the stored proportion. Thus, it is easy to use the comparison to determine whether there is an object in the ground area or not. In particular, it is provided that the proportion of the ultrasonic signal received by the second ultrasonic sensor is determined before the start of travel with the motor vehicle. It may also be provided that the proportion is determined periodically and is compared with the stored proportion as long as the motor vehicle is parked.

According to a further embodiment, an intensity of the ultrasonic signal received by the second ultrasonic sensor is determined after the motor vehicle has been stopped and the intensity is compared with a predetermined reference intensity to detect the object. A plurality of reference measurements can be made before commissioning the ultrasonic sensor device. Thus, reference intensities can be determined that describe the intensity of the ultrasonic signal that is received by the second ultrasonic sensor if there is no object in the ground area. For this purpose, reference measurements can be carried out for different road surfaces, such as asphalted roads, gravel paths and/or grass areas. As already explained, the ultrasonic sensor device can comprise a plurality of ultrasonic sensors. Different measurements can be carried out in which at least one of the ultrasonic sensors is operated as the first ultrasonic sensor and at least one of the ultrasonic sensors is operated as a second ultrasonic sensor. At a later time, others of the ultrasonic sensors can be operated as the first and/or second ultrasonic sensors. These variants can be performed on different reference measurements. A digital map can be provided on the basis of these reference measurements or the stored reference intensities, for example, wherein the digital map describes the intensity of the received ultrasonic signal for the individual ultrasonic sensors in the case in which there is no object in the ground area. Reference intensities can also be stored that describe predetermined objects in the ground area. This enables reliable monitoring of the ground area.

According to a further embodiment, it may be provided that environment influences are also taken into account when monitoring the ground area. For example, there may be snow and/or ice on the road surface in the ground area. This layer of snow and/or ice layer on the road surface results in altered reflective properties of the ultrasonic signal. Depending on the environment temperature and/or the warming of the snow and/or the ice due to the heat of the motor vehicle, these can melt, which can change the reflective properties over time. This can be taken into account in the measurements. This applies in particular to cases where the motor vehicle is parked for a relatively long period of time. Here it may also be the case that the motor vehicle is parked on a lawn, which changes over time and thus changes the reflective properties. By taking these environment parameters into account, the ground area can be monitored in a reliable manner.

According to a further embodiment, the ultrasonic sensors or the first ultrasonic sensor and the second ultrasonic sensor are controlled at predetermined times to clean the respective membranes of the ultrasonic sensors. As already explained, the ultrasonic sensors can comprise membranes. Contamination can accumulate on these membranes during the operation of the motor vehicle. It may also be the case that ice and/or snow are deposited on the membrane. This is in particular due to the fact that the ultrasonic sensors are arranged in the area of the underbody of the motor vehicle. The ultrasonic sensors can be controlled at predetermined times in such a way that the membrane is set into mechanical vibrations or strong natural vibrations. Thus, deposits and/or dirt on the membrane can be loosened. This enables reliable operation of the ultrasonic sensor device.

An ultrasonic sensor device according to the invention for a motor vehicle comprises at least one first ultrasonic sensor, at least one second ultrasonic sensor and a control unit. The ultrasonic sensor device is designed to perform a method according to the invention and the advantageous embodiments thereof.

In particular, it is provided that the ultrasonic sensor device comprises at least two first ultrasonic sensors and/or at least two second ultrasonic sensors. The ultrasonic sensor device can therefore comprise at least four ultrasonic sensors. In particular, the ultrasonic sensor device comprises at least ten ultrasonic sensors. These ultrasonic sensors can then be distributed in the area of the underbody of the motor vehicle and thus the ground area can be reliably monitored. A first group of ultrasonic sensors can be operated as the first ultrasonic sensors, i.e. as transmitters, and a second group of ultrasonic sensors can be operated as the second ultrasonic sensors, i.e. as receivers. It may also be the case that in successive measuring cycles of the ultrasonic sensor device a change occurs as to which of the ultrasonic sensors are operated as first or as second ultrasonic sensors.

In one embodiment, the ultrasonic sensor device comprises at least one environment ultrasonic sensor for detecting a surrounding area of the motor vehicle, wherein the ultrasonic sensor device is a switching device for connecting at least one first ultrasonic sensor and at least one second ultrasonic sensor to the control unit or at least one environment ultrasonic sensor to the control unit. In particular, it is provided that the ultrasonic sensor device comprises a plurality of environment ultrasonic sensors. Said environment ultrasonic sensors may be located on the bumpers of the motor vehicle. The sensor signals from the first and the second ultrasonic sensors, which are used to monitor the ground area, can be evaluated using the control unit. In the same way, the sensor signals provided by the environment ultrasonic sensors can be evaluated by the control unit. Commonly used control units comprise a predetermined number of channels for processing sensor signals. This means that the sensor signals of the ultrasonic sensors and the environment ultrasonic sensors cannot be evaluated at once. This is especially true in the case in which the ultrasonic sensor device comprises up to twelve environment ultrasonic sensors. With the help of the switching device, the ultrasonic sensors can be connected to the control unit at a first time to monitor the ground area. The environment ultrasonic sensors can then be connected to the control unit at a second time. This makes it unnecessary to use two separate control units. This saves costs and space.

It may be provided that the switching device is controlled depending on the current operating state of the motor vehicle. When the motor vehicle stops, the ultrasonic sensors for monitoring the ground area or the first ultrasonic sensor and the second ultrasonic sensor can be connected to the control unit. When starting the motor vehicle or when the vehicle is being driven, the environment ultrasonic sensors can then be activated to monitor the surrounding area. It may also be provided that a digital environment map is generated by means of the control unit based on the respective received sensor signals. This digital environment map can describe both the ground area and the surrounding area. It may be provided that the ground area is first analysed, and the digital environment map is populated with the objects in the ground area. Then the switching device can be switched to the external ultrasonic sensors or environment ultrasonic sensors and the surroundings of the vehicle can be analysed accordingly. Here, too, the objects in the surrounding area can be captured and entered into the digital environment map.

A driver assistance system according to the invention for a motor vehicle comprises an ultrasonic sensor device according to the invention. The driver assistance system is preferably designed to issue a warning depending on the object detected in the ground area. If an object is detected in the ground area using the ultrasonic sensor device, a warning signal can be issued to the driver of the vehicle using the driver assistance system. It may also be provided that the driver assistance system prevents the motor vehicle from starting, so that damage to the motor vehicle and/or the object can be prevented. In particular, an autonomous driving manoeuvre can be prevented if the object is in the ground area.

A motor vehicle according to the invention comprises a driver assistance system according to the invention. In particular, the motor vehicle is embodied as a passenger car. It may also be provided that the motor vehicle is embodied as a commercial vehicle.

In this case, it may be provided that at least one first ultrasonic sensor and/or the at least one second ultrasonic sensor are arranged on an area of the underbody of the motor vehicle. In particular, the ultrasonic sensors are arranged on the underbody of the motor vehicle. The ultrasonic sensors may be embodied in such a way that they can emit the ultrasonic signal at an angle towards the road surface and/or that they can receive ultrasonic signals reflected from the road surface. The ultrasonic sensors can be located at the corner areas of the motor vehicle. Thus, it is made possible in particular that the ultrasonic signal can be transmitted diagonally along the ground area from the first ultrasonic sensor to the second ultrasonic sensor. It may also be provided that the ultrasonic sensors are arranged in the side areas, the front area and/or the rear area. The ultrasonic sensors are arranged in particular in the centre of the side area, the rear area and or the front area. It may also be provided that the ultrasonic sensors are arranged in a respective area in front of and/or behind the wheels. In this area, there is the greatest risk of injury to animals that are in the ground area. This can reliably prevent the object from being damaged by rolling over it with one of the wheels.

In a further embodiment, the at least one first ultrasonic sensor and/or the at least one second ultrasonic sensor are arranged on a steering element of the steerable wheels of the motor vehicle. For example, the steering element may be a wheel carrier. The steering element is connected to the steerable wheels of the motor vehicle. In particular, the ultrasonic sensors are arranged on the steering element in such a way that they can be moved together with the steering element during the intervention in the steering. If the steering is now operated with the motor vehicle stationary, the steering element is moved. This causes the ultrasonic sensors located on the steering element to also move. In this way, the ultrasonic sensors can be swiveled. Thus, the detection range of the ultrasonic sensors can be easily expanded.

The preferred embodiments presented with reference to the method according to the invention and their advantages apply accordingly to the ultrasonic sensor device according to the invention, to the driver assistance system according to the invention as well as to the motor vehicle according to the invention.

Further features of the invention result from the claims, the figures and the description of the figures. The characteristics and combinations of features mentioned above in the description as well as the characteristics and/or combinations of features mentioned in the description of the figures alone are not only usable in the respective given combination but can also be used in other combinations without departing from the scope of the invention. Therefore embodiments of the invention are also to be regarded as included and disclosed that are not explicitly revealed and explained in the figures but that arise from the described embodiments as a result of separate combinations of features and that can be produced. Embodiments and combinations of features are also to be regarded as disclosed that do not comprise all the features of an originally formulated independent claim. Furthermore, embodiments and combinations of features, in particular as a result of the aforementioned embodiments, that go beyond or deviate from the combinations of features set out in the references to the claims are to be regarded as disclosed.

The invention will now be described in more detail on the basis of preferred embodiments and with reference to the attached drawings.

In the figures.

In the figures, identical and functionally identical elements are provided with the same reference characters.

Figure 1:
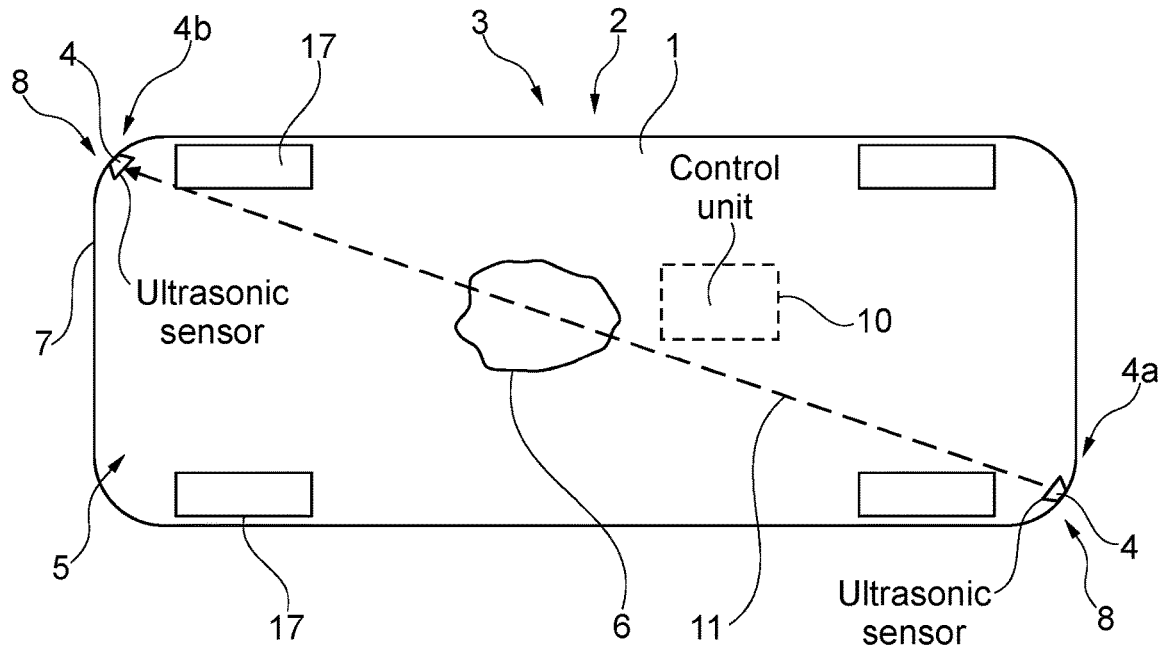
FIG. 1 shows a motor vehicle according to an embodiment of the invention that comprises an ultrasonic sensor device for monitoring a ground area below the motor vehicle, wherein the ultrasonic sensor device comprises two ultrasonic sensors.

FIG. 1 shows a motor vehicle 1 according to an embodiment of the invention from a bottom view. The motor vehicle 1 is embodied as a passenger car in the present case. The motor vehicle 1 comprises a driver assistance system 2 as well as an ultrasonic sensor device 3. With the help of the ultrasonic sensor device 3, a ground area 5 below the motor vehicle 1 can be monitored. In particular, by means of the ultrasonic sensor device 3 it can be checked whether there is an object 6 located in the ground area 5.

The ultrasonic sensor device 3 comprises at least two ultrasonic sensors 4. In the present embodiment, the ultrasonic sensor device 3 comprises two ultrasonic sensors 4. The ultrasonic sensors 4 can each be used to emit an ultrasonic signal and receive an ultrasonic signal. In the present case, the ultrasonic sensors 4 are arranged on an underbody 7 of the motor vehicle 1. In this embodiment, the ultrasonic sensors 4 are arranged at opposite corner areas 8. One of the ultrasonic sensors 4 is operated as the first ultrasonic sensor 4a or as a transmitter. The ultrasonic signal is emitted by the first ultrasonic sensor 4a. This emitted ultrasonic signal can then be reflected at a road surface 9 of the ground area 5 and/or at the underbody 7. The other ultrasonic sensor 4 is operated as a second ultrasonic sensor 4b or as a receiver. The ultrasonic signal can be received by the second ultrasonic sensor 4b.

The ultrasonic sensor device 3 further comprises a control unit 10. A sensor signal that describes the received ultrasonic signal can be received from the second ultrasonic sensor 4b by the control unit 10. In the present case, the object 6 is located on a transmission line 11 between the first ultrasonic sensor 4a and the second ultrasonic sensor 4b. The ultrasonic signal is transmitted from the first ultrasonic sensor 4a to the second ultrasonic sensor 4b along this transmission line 11. Thus, the ultrasonic signal emitted by the first ultrasonic sensor 4a is reflected at the object 6. Thus, no ultrasonic signal is received by the second ultrasonic sensor 4b. By evaluating the sensor signal by means of the control unit 10, it can then be recognized that the object 6 is located in the ground area 5.

Figure 2:
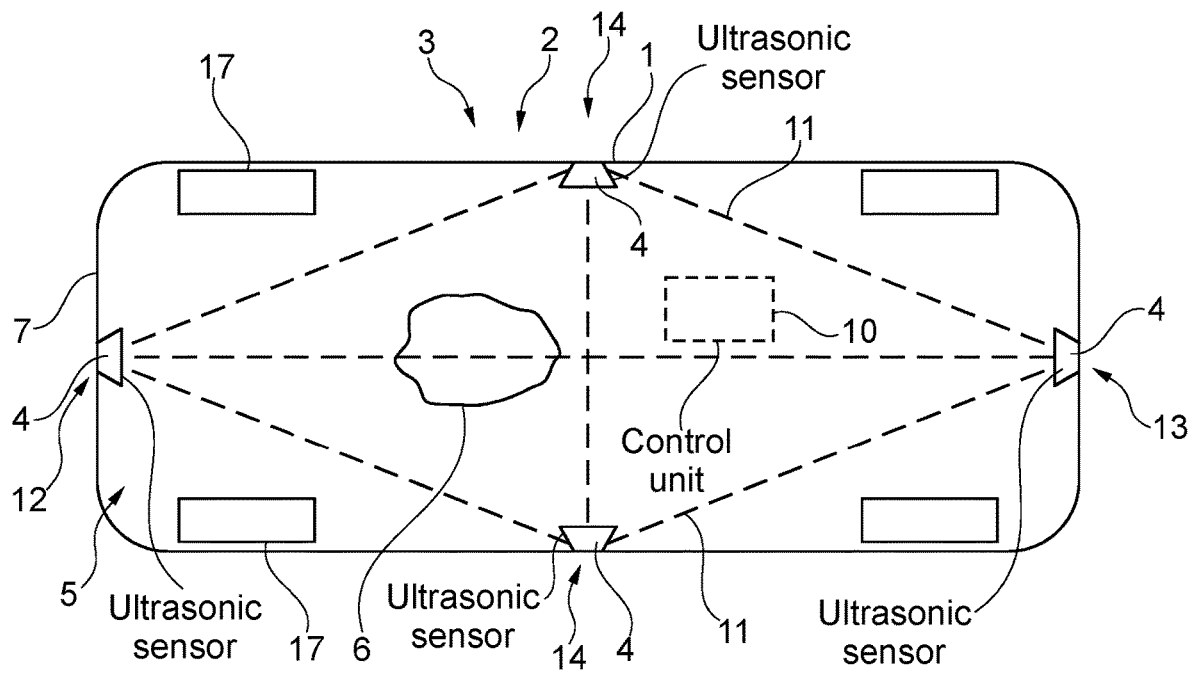
FIG. 2 shows a motor vehicle with an ultrasonic sensor device according to one embodiment, wherein the ultrasonic sensor device comprises four ultrasonic sensors.

FIG. 2 shows a motor vehicle 1 with an ultrasonic sensor device 3 according to a further embodiment. Here, the ultrasonic sensor device 3 comprises four ultrasonic sensors 4. One of the ultrasonic sensors 4 is arranged in the middle of a front area 12 of the motor vehicle 1, another of the ultrasonic sensors 4 is arranged in the middle of a rear area 13 of the motor vehicle 1 and the remaining two ultrasonic sensors 4 are centred on the respective side areas 14 of the motor vehicle 1. The 4 ultrasonic sensors can basically be operated as first ultrasonic sensors 4a or as transmitters, or as second ultrasonic sensors 4b or as receivers. Between these four ultrasonic sensors 4 there are different transmission lines 11 via which the ultrasonic signals can be exchanged. On the basis of the ultrasonic signal received by one of the second ultrasonic sensors 4b, it can then be recognized that the object 6 is located in the ground area 5. Furthermore, using the known transmission lines 11 it can be determined where this object 6 is located in the ground area 5.

Figure 3:
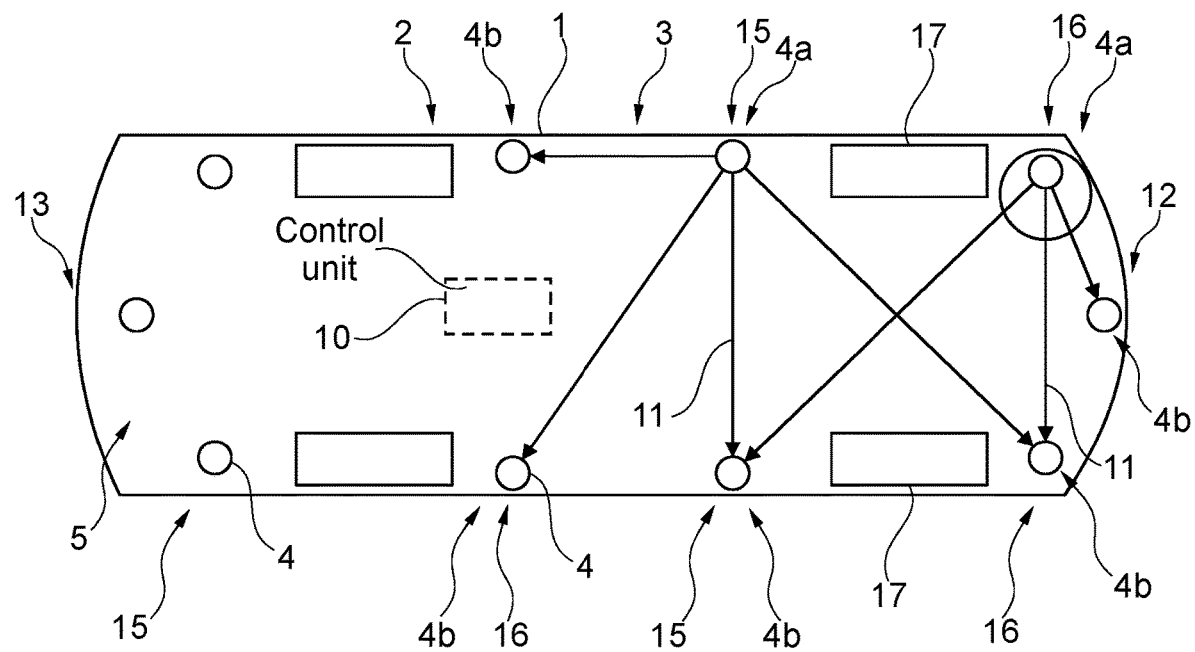
FIG. 3 shows a motor vehicle with an ultrasonic sensor device according to a further embodiment, wherein the ultrasonic sensor device comprises ten ultrasonic sensors.

FIG. 3 shows a motor vehicle 1 with an ultrasonic sensor device 3 according to a further embodiment. Here, the ultrasonic sensor device 3 comprises ten ultrasonic sensors 4. Here, one of the ultrasonic sensors 4 is arranged in the centre in the front area 12 of the motor vehicle 1 and one of the ultrasonic sensors 4 is arranged in the centre in the rear area 13 of the motor vehicle 1. The other ultrasonic sensors 4 are arranged in areas 15 in front of the wheels 17 of the motor vehicle 1 and in areas 16 behind the wheels 17 of the motor vehicle 1. In the present example, two of the ultrasonic sensors 4 are operated as first ultrasonic sensors 4a. Here, too, some of the transmission lines 11 between the first ultrasonic sensors 4a and the second ultrasonic sensors 4b are shown by way of example.

Figure 4:
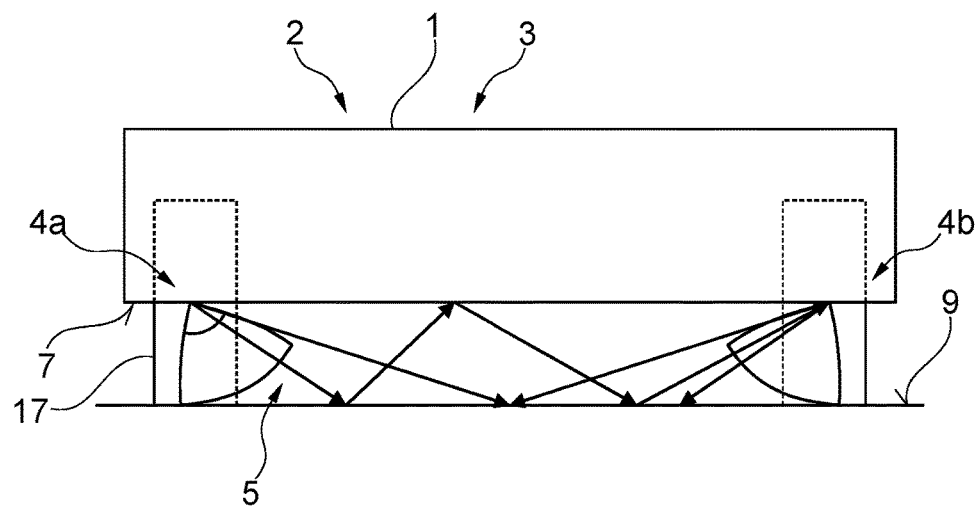
FIG. 4 shows the motor vehicle in accordance with FIG. 3 in a side view.

By way of example, FIG. 4 shows the propagation of the ultrasonic signals that are emitted with the first ultrasonic sensors 4a and received by the second ultrasonic sensors 4b. It can be seen that the ultrasonic signals are reflected on the one hand at the road surface 9 and on the other hand at the underbody 7. Thus, the entire ground area 5 can be monitored for the presence of the object 6.

Figure 5:
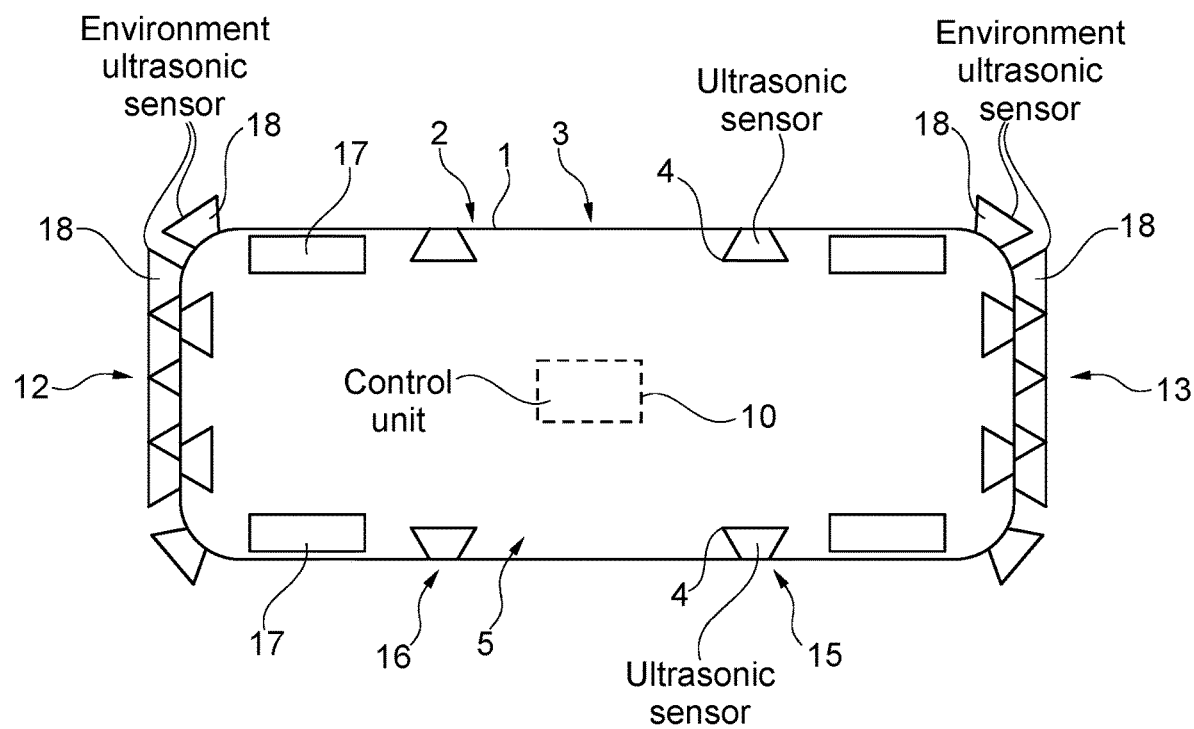
FIG. 5 shows a motor vehicle with an ultrasonic sensor device according to a further embodiment, wherein the ultrasonic sensor device also comprises a plurality of environment ultrasonic sensors.

FIG. 5 shows a motor vehicle 1 with an ultrasonic sensor device 3 according to a further embodiment. Here, the ultrasonic sensor device 3 comprises eight ultrasonic sensors 4. Two of the ultrasonic sensors 4 are arranged in the front area 12 of the motor vehicle 1 and two of the ultrasonic sensors 4 are arranged in the rear area 13 of the motor vehicle 1. Furthermore, 2 of the ultrasonic sensors 4 are arranged in the areas 15 in front of the wheels 17 and two ultrasonic sensors 4 are arranged in the areas 16 behind the wheels 17.

In addition, the ultrasonic sensor device 3 comprises a plurality of environment ultrasonic sensors 18. With the environment ultrasonic sensors 18, a surrounding area 19 around the motor vehicle 1 can be detected. In the present case, six environment ultrasonic sensors 18 are located in the front area 12 and six environment ultrasonic sensors are arranged in the rear area 13. The environment ultrasonic sensors 18 may be arranged on the bumper of the motor vehicle 1.

Figure 6:
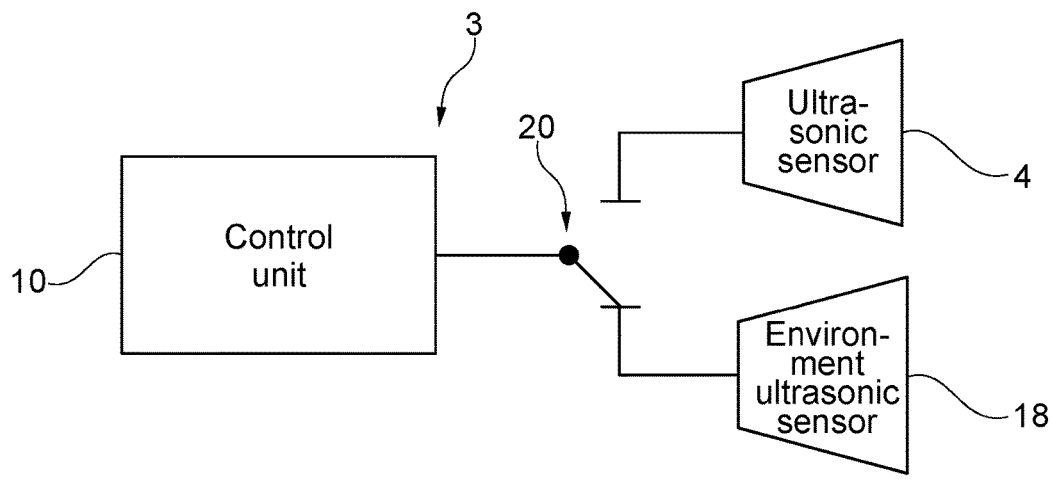
FIG. 6 shows a schematic representation of an ultrasonic sensor device that includes an ultrasonic sensor for monitoring the ground area and an environment ultrasonic sensor.

FIG. 6 shows a schematic representation of an ultrasonic sensor device 3 according to a further embodiment. In the present case, one of the ultrasonic sensors 4 and one of the environment ultrasonic sensors 18 as well as the control unit 10 are shown by way of example. The ultrasonic sensor device 3 also comprises a switching device 20, which is shown by way of example. By means of the switching device 20 either the ultrasonic sensors 4 can be connected to the control unit 10 for data transmission or the environment ultrasonic sensors 18 can be connected to the control unit 10 for data transmission. For example the ground area 5 can be monitored at a first time. For this purpose, the ultrasonic sensors 4 can be connected to the control unit 10. This is carried out in particular when the motor vehicle 1 is stationary. For example, a digital environment map can be determined, which describes the objects 6 in the ground area 5. At a later time, the environment ultrasonic sensors 18 can then be connected to the control unit 10. This is carried out in particular when the motor vehicle 1 is moving. Thus, the surrounding area 19 of the motor vehicle 1 can be detected and the digital environment map for the surrounding area 19 can be updated.

Before starting a journey, it is possible to check whether there is an object in the ground area 5. If an object 6 is detected in the ground area 5 by means of the ultrasonic sensor device 3, a warning can be issued to the driver of the motor vehicle 1 by means of the driver assistance system 2. It may also be provided that starting the motor vehicle 1 is prevented and/or that an autonomous journey with the motor vehicle 1 is not started as long as the object 6 is present in the ground area 5.

The invention claimed is:

1. A method for operating an ultrasonic sensor device for a motor vehicle, comprising:
   emitting a first ultrasonic signal to a ground area below the motor vehicle;
   receiving a second ultrasonic signal from the ground area; and
   detecting an object in the ground area by a control unit on the basis of the emitted and/or the received ultrasonic signals,
   wherein the first ultrasonic signal is emitted by a first ultrasonic sensor of the ultrasonic sensor device and wherein the first ultrasonic signal is reflected at a road surface in the ground area and is received as the second ultrasonic signal by a second ultrasonic sensor of the ultrasonic sensor device,
   wherein the object is detected by the control unit on the basis of a proportion of the second ultrasonic signal that is received by the second ultrasonic sensor with respect to the first ultrasonic signal,
   wherein the proportion of the second ultrasonic signal received by the second ultrasonic sensor is stored after the motor vehicle is stopped, and
   wherein the proportion of the second ultrasonic signal received by the second ultrasonic sensor is determined again at a later time and is compared with the stored proportion.

2. The method according to claim 1, wherein the object is detected from the proportion of the second ultrasonic signal received by the second ultrasonic sensor while the motor vehicle is at a standstill.

3. The method according to claim 1, wherein the proportion of the second ultrasonic signal received after stopping the motor vehicle is determined periodically and is compared with the stored proportion.

4. The method according to claim 1, wherein an intensity of the second ultrasonic signal is determined after stopping the motor vehicle and compared with a predetermined reference intensity to detect the object.

5. The method according to claim 1, wherein the first ultrasonic sensor and the second ultrasonic sensor are controlled at predetermined times for cleaning a respective membrane of the ultrasonic sensors.

6. An ultrasonic sensor device for a motor vehicle, comprising:
   at least one first ultrasonic sensor configured to emit a first ultrasonic signal into a ground area below the motor vehicle;
   at least one second ultrasonic sensor configured to receive a second ultrasonic signal which is the first ultrasonic signal reflected at a road surface in the ground area; and
   one control unit,
   wherein the ultrasonic sensor device detects an object in the ground area below the motor vehicle on the basis of the emitted and/or the received ultrasonic signals,
   wherein the ultrasonic sensor device detects the object on the basis of a proportion of the second ultrasonic signal that is received by the second ultrasonic sensor with respect to the first ultrasonic signal,
   wherein the ultrasonic sensor device is configured to store the proportion of the second ultrasonic signal received by the at least one second ultrasonic sensor after the motor vehicle is stopped, and
   wherein the ultrasonic sensor device is configured to determine the proportion of the second ultrasonic signal received by the at least one second ultrasonic sensor again at a later time and compare the determined proportion with the stored proportion.

7. The ultrasonic sensor device according to claim 6, the ultrasonic sensor device comprises at least ten ultrasonic sensors.

8. The ultrasonic sensor device according to claim 6, wherein the ultrasonic sensor device comprises at least one environment ultrasonic sensor for detecting a surrounding area of the motor vehicle, wherein the ultrasonic sensor device comprises a switching device for connecting the at least one first ultrasonic sensor and the at least one second ultrasonic sensor to the control unit or the at least one environment ultrasonic sensor to the control unit.

9. A driver assistance system for a motor vehicle with an ultrasonic sensor device according to claim 6, wherein the driver assistance system issues a warning to a driver of the motor vehicle depending on the object detected in the ground area.

10. A motor vehicle with a driver assistance system according to claim 9.

11. A motor vehicle according to claim 10, wherein at least one first ultrasonic sensor and/or at least one second ultrasonic sensor are arranged in corner areas on an underbody of the motor vehicle.

12. A motor vehicle according to claim 10, wherein the at least one first ultrasonic sensor and/or the at least one second ultrasonic sensor are arranged on the underbody of the motor vehicle in the centre of a side area, a front area and/or a rear area.

13. The motor vehicle according to claim 10, wherein the at least one first ultrasonic sensor and/or the at least one second ultrasonic sensor are arranged on the underbody of the motor vehicle in an area in front of and/or an area behind one of the wheels of the motor vehicle.

14. The motor vehicle according to claim 10, wherein at least one first ultrasonic sensor and/or at least one second ultrasonic sensor are arranged on a steering element of the steerable wheels of the motor vehicle.

* * * * *